(12) United States Patent
Hung et al.

(10) Patent No.: US 10,801,765 B2
(45) Date of Patent: Oct. 13, 2020

(54) VARIABLE SPEED BLOWER CONTROL FOR HVAC SYSTEMS

(71) Applicant: Lennox Industries Inc., Richardson, TX (US)

(72) Inventors: Der-Kai Hung, Dallas, TX (US); Roger Hundt, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 82 days.

(21) Appl. No.: 16/029,175

(22) Filed: Jul. 6, 2018

(65) Prior Publication Data

US 2020/0011579 A1    Jan. 9, 2020

(51) Int. Cl.
| | | |
|---|---|---|
| *F25B 49/02* | (2006.01) | |
| *F24F 11/64* | (2018.01) | |
| *F24F 11/46* | (2018.01) | |

(52) U.S. Cl.
CPC ............ *F25B 49/022* (2013.01); *F24F 11/46* (2018.01); *F24F 11/64* (2018.01)

(58) Field of Classification Search
CPC ............ F25B 2600/11; F25B 2600/111; F25B 2600/112; F25B 2700/17; F25B 2700/171; F25B 2700/172; F25B 2700/173; F25B 49/022; F24F 2110/10; F24F 2110/12
See application file for complete search history.

(56) References Cited

U.S. PATENT DOCUMENTS

| | | | | |
|---|---|---|---|---|
| 3,667,245 | A * | 6/1972 | Till | ...................... B60H 1/3211 62/180 |
| 5,062,276 | A | 11/1991 | Dudley | |
| 2004/0261441 | A1 | 12/2004 | Turner et al. | |
| 2013/0104578 | A1 * | 5/2013 | Jessen | ...................... F25D 17/06 62/89 |
| 2014/0360212 | A1 * | 12/2014 | Bae | ......................... F25B 49/02 62/89 |
| 2015/0330651 | A1 * | 11/2015 | Goel | ....................... G05B 15/02 700/276 |
| 2015/0338111 | A1 | 11/2015 | Havard et al. | |

FOREIGN PATENT DOCUMENTS

EP        1862745 A2    12/2007

OTHER PUBLICATIONS

European Patent Office, Extended European Search Report, Application No. 19184347.3, dated Nov. 14, 2019, 7 pages.

* cited by examiner

*Primary Examiner* — Frantz F Jules
*Assistant Examiner* — Erik Mendoza-Wilkenfel
(74) *Attorney, Agent, or Firm* — Baker Botts L.L.P.

(57) ABSTRACT

A temperature control system that includes a sensor, a variable speed blower, and a controller. The controller is configured to receive an air temperature measurement from the sensor and determine a temperature value based on the received air temperature measurement. The controller is further configured to compare the determined temperature value to a first threshold value and a second threshold value and to operate the variable speed blower based on the comparison. The controller is configured to set the variable speed blower to a first fan speed when the temperature value is below the first threshold value and to a second fan speed when the temperature value is above the second threshold value. The controller is further configured to set the variable speed blower to a third fan speed that linearly correlates with temperature when the temperature value is between the first threshold and the second threshold.

20 Claims, 4 Drawing Sheets

VARIABLE SPEED BLOWER CONTROL FOR HVAC SYSTEMS

TECHNICAL FIELD

This disclosure relates generally to heating, ventilating, and air conditioning (HVAC) systems, and more specifically to systems and methods for controlling the cooling capacity of an HVAC system.

BACKGROUND

The cooling capacity of an HVAC system changes with respect to the outdoor ambient temperature. At lower outside ambient temperatures, the load on a conditioned space is low, and the ability of an HVAC system to reject heat is higher as a result of the lower outdoor air temperature. As the outdoor ambient temperature increases, the load on the space increases and the effectiveness of the cooling equipment decreases. When outdoor ambient temperature drops, a differential is formed between the load and the capacity of an HVAC system. This difference corresponds with an amount of excess cooling capacity for the HVAC system which translates into wasted energy consumption. Thus, it is desirable to reduce excess cooling capacity to reduce energy consumption.

Conventional systems typically use multi-stage compressors to adjust the cooling capacity of an HVAC system. These systems use multiple constant speed compressors to provide cooling capacity. As outdoor ambient temperature changes, these systems can turn on or turn off one or more compressors to adjust the cooling capacity of the HVAC system. For example, as the outdoor ambient temperature drops, the HVAC system may turn off one or more compressors to reduce the excess cooling capacity of the HVAC system. These systems are able to adjust the cooling capacity of the HVAC system, but require multiple compressors and additional hardware for controlling and operating the compressors. This configuration increases the complexity, the costs, and the physical footprint of the HVAC system.

SUMMARY

Conventional systems typically use multi-stage compressors to adjust the cooling capacity of an HVAC system. These systems use multiple constant speed compressors to provide cooling capacity. As outdoor ambient temperature changes, these systems can turn on or turn off one or more compressors to adjust the cooling capacity of the HVAC system. For example, as the outdoor ambient temperature drops, the HVAC system may turn off one or more compressors to reduce the excess cooling capacity of the HVAC system. These systems are able to adjust the cooling capacity of the HVAC system, but require multiple compressors and additional hardware for controlling and operating the compressors. This configuration increases the complexity, the costs, and the physical footprint of the HVAC system.

In contrast, the disclosed HVAC system uses a variable speed blower to adjust the cooling capacity of the HVAC system. In this configuration, the HVAC system adjusts the cooling capacity of the HVAC system by adjusting the fan speed of the variable speed blower. As the outdoor ambient temperature changes, the HVAC system can increase or decrease the fan speed of a variable speed blower to adjust the cooling capacity of the HVAC system. For example, as the outdoor ambient temperature drops, the HVAC system may reduce the fan speed of the variable speed blower to reduce the excess cooling capacity of the HVAC system. In this example, the differential between the load and the capacity of the HVAC system is less than the differential between the load and the capacity of conventional HVAC systems. The reduced differential indicates that by adjusting (e.g. reducing) the fan speed of a variable speed blower the HVAC system is able to reduce excess cooling capacity, energy consumption, and cycling.

The present embodiment presents several technical advantages that improve the operation of an HVAC system. In some embodiments, variable speed blower control may be used with HVAC systems that are not configured to implement multi-stage compressors. In these systems, variable speed blower control provides the ability for the HVAC system to reduce cooling capacity without having to turn off any compressors. This configuration reduces complexity, costs, and the physical footprint of the HVAC system compared to systems that use multi-stage compressors to control cooling capacity. In other embodiments, variable speed blower control may be used with HVAC systems configured to implement multi-stage compressors. In these systems, variable speed blower control provides the ability to further reduce cooling capacity in addition to turning off one or more compressors. In other words, the HVAC system may turn off one or more compressors to provide a coarse cooling capacity adjustment and may reduce the fan speed of a variable speed blower to provide fine cooling capacity adjustments.

In one embodiment, a variable speed blower controller provides a gradual transition between fan speed levels of a variable speed blower. For example, the controller may initially set the variable speed blower at a high fan speed based on the cooling capacity needed for the HVAC system. Over time the cooling capacity need may lower as temperature (e.g. outdoor ambient temperature) decreases. The controller is configured to gradually transition the variable speed blower to a lower fan speed rather than abruptly changing the fan speed from a high speed to a lower speed. In this example, the controller decreases the speed of variable speed blower linearly with temperature until the lower fan speed is achieved rather than abruptly switching between fan speeds.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
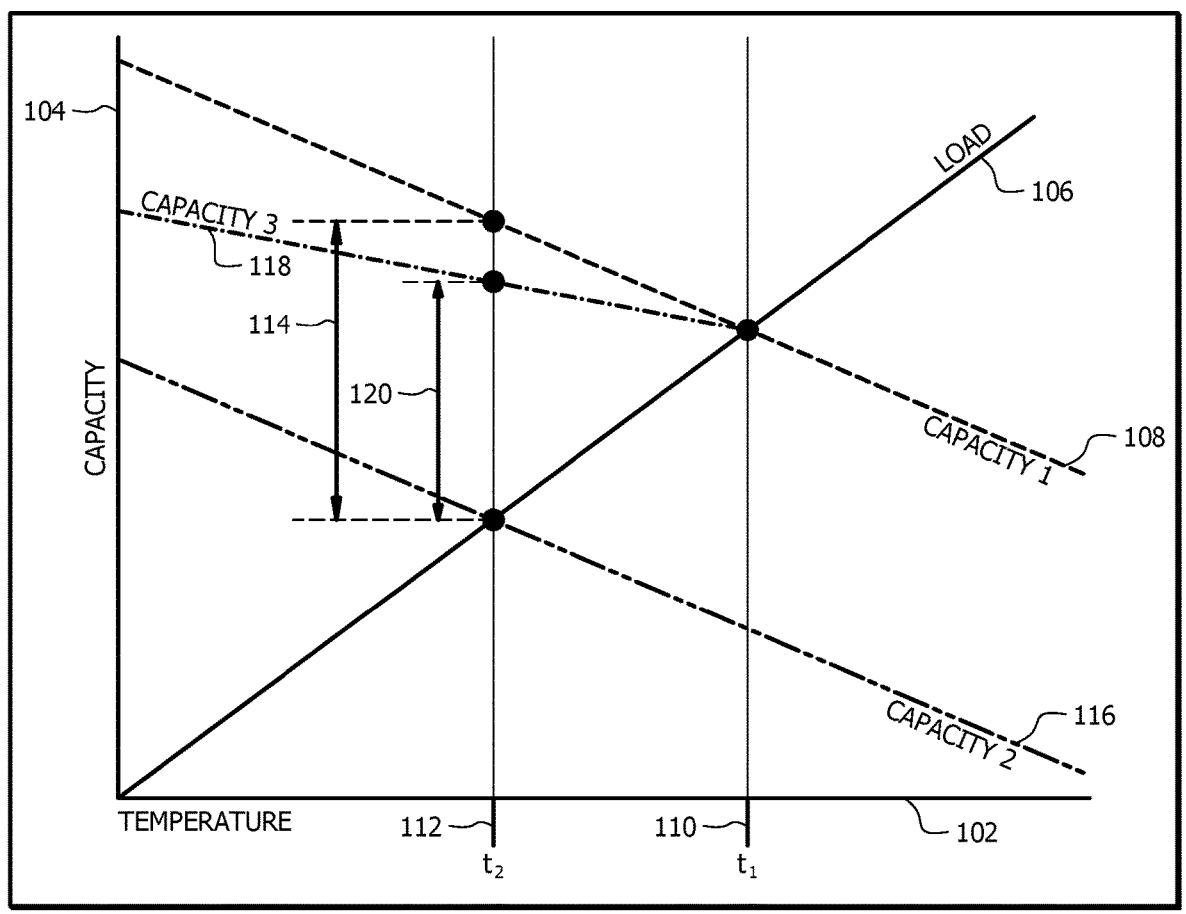
FIG. 1 is a graph of cooling capacity versus temperature for heating, ventilation, and air conditioning (HVAC) systems.

FIG. 1 is a graph 100 of cooling capacity versus temperature for heating, ventilation, and air conditioning (HVAC) systems. Axis 102 indicates temperature, for example in degrees Celsius or Fahrenheit, and axis 104 indicates cooling capacity, for example in tons, British Thermal Units per hour (BTU/h), or Watts (W). The cooling capacity of an HVAC system changes with respect to outdoor ambient temperature. At lower outdoor ambient temperatures, the load on a conditioned space is low, and the ability of the HVAC system to reject heat is higher as a result of the lower outdoor air temperature. As the outdoor ambient temperature increases, the load on the space increases and the effectiveness of the cooling equipment decreases. Load line 106 is an example a load over a range of outdoor ambient temperatures. The load is the amount of heat energy that would need to be removed from a space to maintain a desired temperature.

The first capacity line 108 is an example of a first cooling capacity for an HVAC system over a range of temperatures. At a first outdoor ambient temperature 110, the load line 106 and the first capacity line 108 intersect which indicates that the HVAC system is able to meet desired cooling demand without having excess cooling capacity. If the outdoor ambient temperature drops to a second outdoor ambient temperature 112, then a differential 114 is formed between the load line 106 and the first capacity line 108. The difference 114 between the load line 106 and the first capacity line 108 corresponds with an amount of excess cooling capacity for the HVAC system which translates into wasted energy consumption. It is desirable to reduce excess cooling capacity to reduce energy consumption.

Conventional systems typically use multi-stage compressors to adjust the cooling capacity of an HVAC system. These systems use multiple constant speed compressors to provide cooling capacity. As the outdoor ambient temperature changes, these systems can turn on or turn off one or more compressors to adjust the cooling capacity of the HVAC system. For example, as the outdoor ambient temperature drops, the HVAC system may turn off one or more compressors to reduce the excess cooling capacity of the HVAC system. The second capacity line 116 is an example of a second cooling capacity for an HVAC system that turns off one or more compressors to adjust its cooling capacity. In this example, the load line 106 and the second capacity line 116 intersect which indicates that the HVAC system is able to meet desired cooling demand without having excess cooling capacity. These systems are able to adjust the cooling capacity of the HVAC system, but require multiple compressors and additional hardware for controlling and operating the compressors. This configuration increases the complexity, the costs, and the physical footprint of the HVAC system.

In contrast, the disclosed HVAC system uses a variable speed blower to adjust the cooling capacity of the HVAC system. An example of an HVAC system 200 that uses a variable speed blower 224 to adjust the cooling capacity is described in FIG. 2. In this configuration, the HVAC system 200 adjusts the cooling capacity of the HVAC system 200 by adjusting the fan speed of the variable speed blower 224. As the outdoor ambient temperature changes, the HVAC system 200 can increase or decrease the fan speed of a variable speed blower 224 to adjust the cooling capacity of the HVAC system 200. For example, as the outdoor ambient temperature drops, the HVAC system 200 may reduce the fan speed of the variable speed blower 224 to reduce the excess cooling capacity of the HVAC system 200. Referring back to FIG. 1, the third capacity line 118 is an example of a third cooling capacity for an HVAC system that reduces the fan speed of a variable speed blower to adjust its cooling capacity, for example using a method such as method 500 in FIG. 5. In this example, the differential 120 between the load line 106 and the third capacity line 118 is less than the differential 114 between the load line 106 and the first capacity line 108. The reduced differential 120 indicates that by adjusting (e.g. reducing) the fan speed of a variable speed blower the HVAC system is able to reduce excess cooling capacity and energy consumption. As an example, in a 25-ton rooftop HVAC system, reducing the fan speed by 37.5% will reduce power consumption of a blower by 73%, which leads to an efficiency increase of about 6%.

In some embodiments, variable speed blower control may be used with HVAC systems that are not configured to implement multi-stage compressors. In these systems, variable speed blower control provides the ability for the HVAC system to reduce cooling capacity without having to turn off any compressors. This configuration reduces the complexity, costs, and the physical footprint of the HVAC system compared to systems that use multi-stage compressors to control cooling capacity.

In other embodiments, variable speed blower control may be used with HVAC systems configured to implement multi-stage compressors. In these systems, variable speed blower control provides the ability to further reduce cooling capacity in addition to turning off one or more compressors. In other words, the HVAC system may turn off one or more compressors to provide a coarse cooling capacity adjustment and may reduce the fan speed of a variable speed blower to provide fine cooling capacity adjustments.

Figure 2:
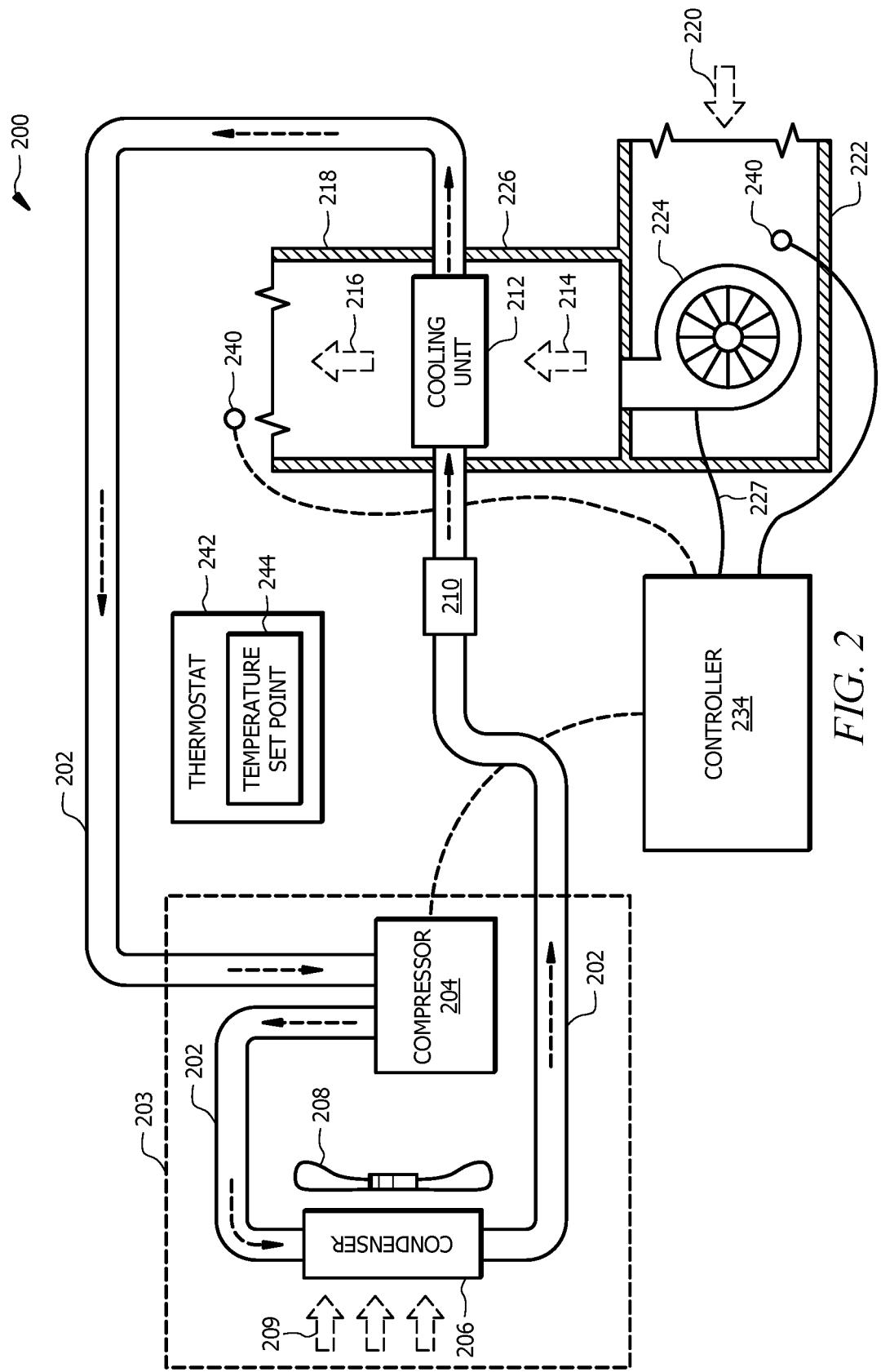
FIG. 2 is a schematic diagram of an embodiment of an HVAC system with variable speed control for a variable-speed blower.

FIG. 2 is a schematic diagram of an embodiment of an HVAC system 200 with variable speed control for a variable-speed blower 224. The HVAC system 200 conditions air for delivery to an interior space of a building. In some embodiments, the HVAC system 200 is a rooftop unit (RTU) that is positioned on the roof of a building and the conditioned air is delivered to the interior of the building. In other embodiments, portions of the system may be located within the building and a portion outside the building. The HVAC system 200 may also include heating elements that are not shown here for convenience and clarity. The HVAC system 200 may be configured as shown in FIG. 2 or in any other suitable configuration. For example, the HVAC system 200 may include additional components or may omit one or more components shown in FIG. 2.

The HVAC system 200 comprises a working-fluid conduit subsystem 202 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The HVAC system 200 comprises one or more condensing units 203. In one embodiment, the condensing unit 203 comprises a compressor 204, a condenser 206, and a fan 208. The compressor 204 is coupled to the working-fluid conduit subsystem 202 that compresses the working fluid. The condensing unit 203 may be configured with a single-stage or multi-stage compressor 204. A single-stage compressor 204 is configured to operate at a constant speed to increase the pressure of the working fluid to keep the working fluid moving along the working-fluid conduit subsystem 202. A multi-stage compressor 204 comprises multiple compressors configured to operate at a constant speed to increase the pressure of the working fluid to keep the working fluid moving along the working-fluid conduit subsystem 202. In this configuration, one or more compressors can be turned on or off to adjust the cooling capacity of the HVAC system 200. An example of how a multi-stage compressor 204 operates to adjust the cooling capacity of an HVAC system was previously described in FIG. 1. In some embodiments, a compressor 204 may be configured to operate at multiple speeds or as a variable speed compressor. For example, the compressor 204 may be configured to operate at multiple predetermined speeds.

In one embodiment, the condensing unit 203 (e.g. the compressor 204) is in signal communication with a controller 234 using a wired or wireless connection. The controller 234 is configured to provide commands or signals to control the operation of the compressor 204. For example, the controller 234 is configured to send signals to turn on or off one or more compressors 204 when the condensing unit 203 comprises a multi-stage compressor 204. In this configuration, the controller 234 may operate the multi-stage compressors 204 in a first mode where all the compressors 204 are on and a second mode where at least one of the compressors 204 is off. In some examples, the controller 234 may be configured to control the speed of the compressor 204.

The condenser 206 is configured to assist with moving the working fluid through the working-fluid conduit subsystem 202. The condenser 206 is located downstream of the compressor 204 for rejecting heat. The fan 208 is configured to move air 209 across the condenser 206. For example, the fan 208 may be configured to blow outside air through the heat exchanger to help cool the working fluid. The compressed, cooled working fluid flows downstream from the condenser 206 to an expansion device 210, or metering device.

The expansion device 210 is configured to remove pressure from the working fluid. The expansion device 210 is coupled to the working-fluid conduit subsystem 202 downstream of the condenser 206. The expansion device 210 is closely associated with a cooling unit 212 (e.g. an evaporator coil). The expansion device 210 is coupled to the working-fluid conduit subsystem 202 downstream of the condenser 206 for removing pressure from the working fluid. In this way, the working fluid is delivered to the cooling unit 212 and receives heat from airflow 214 to produce a treated airflow 216 that is delivered by a duct subsystem 218 to the desired space, for example a room in the building.

A portion of the HVAC system 200 is configured to move air across the cooling unit 212 and out of the duct subsystem 218. Return air 220, which may be air returning from the building, fresh air from outside, or some combination, is pulled into a return duct 222. A suction side of a variable-speed blower 224 pulls the return air 220. The variable-speed blower 224 discharges airflow 214 into a duct 226 from where the airflow 214 crosses the cooling unit 212 or heating elements (not shown) to produce the treated airflow 216.

Examples of a variable-speed blower 224 include, but are not limited to, belt-drive blowers controlled by inverters, direct-drive blowers with electronically commutated motors (ECM), or any other suitable types of blowers. Conventional variable-speed blower 224 are typically configured to operate at multiple predetermined fan speeds. In contrast, the controller 234 is configured to operate the variable-speed blower 224 to operate at a fan speed that linearly correlates with temperature. In this configuration, the fan speed of the variable-speed blower 224 can vary dynamically based on a corresponding temperature value instead of relying on using predetermined fan speeds. In other words, the variable-speed blower 224 may be configured to dynamically adjust its fan speed over a range of fan speeds rather than using a set of predetermined fan speeds. This feature also allows the controller 234 to gradually transition the speed of the variable-speed blower 224 between different operating speeds. This contrasts with conventional configurations where a variable-speed blower 224 is abruptly switched between different predetermined fan speeds. Examples of the controller 234 controlling the variable-speed blower 224 are described in FIGS. 4 and 5. The variable-speed blower 224 is in signal communication with the controller 234 using any suitable type of wired or wireless connection 227. The controller 234 is configured to provide commands or signals to the variable-speed blower 224 to control the operation of the variable-speed blower 224. For example, the controller 234 is configured to send signals to the variable-speed blower 224 to control the fan speed of the variable-speed blower 224. In some embodiments, the controller 234 may be configured to send other commands or signals to the variable-speed blower 224 to control any other functionality of the variable-speed blower 224. Additional information about the controller 234 is described in FIG. 3.

The HVAC system 200 comprises one or more sensors 240 in signal communication with the controller 234. The sensors 240 may comprise any suitable type of sensor for measuring air temperature. The sensors 240 may be positioned anywhere within a conditioned space (e.g. a room or building) and/or the HVAC system 200. For example, the HVAC system 200 may comprise a sensor 240 positioned and configured to measure an outdoor air temperature. As another example, the HVAC system 200 may comprise a sensor 240 positioned and configured to measure a supply or treated air temperature and/or a return air temperature. In other examples, the HVAC system 200 may comprise sensors 240 positioned and configured to measure any other suitable type of air temperature.

The HVAC system 200 comprises one or more thermostats 242, for example located within a conditioned space (e.g. a room or building). A thermostat 242 may be a single-stage thermostat, a multi-stage thermostat, or any suitable type of thermostat as would be appreciated by one of ordinary skill in the art. The thermostat 242 is configured to allow a user to input a desired temperature or temperature set point 244 for a designated space or zone such as the room. The controller 234 may use information from the thermostat 242 such as the temperature set point 244 for controlling the compressor 204 and the variable-speed blower 224. The thermostat 242 is in signal communication with the controller 234 using any suitable type of wired or wireless communications.

Figure 3:
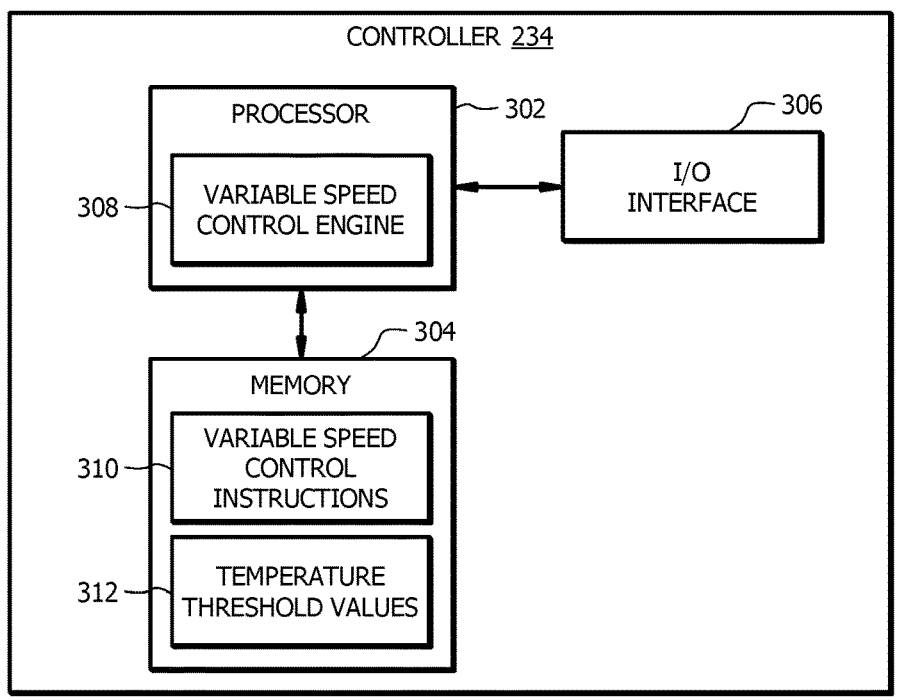
FIG. 3 is a schematic diagram of an embodiment of a variable speed blower controller.

FIG. 3 is a schematic diagram of an embodiment of a variable speed blower controller 234. The controller 234 comprises a processor 302, a memory 304, and an input/output (I/O) interface 306. The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a variable speed control engine 308. In an embodiment, the variable speed control engine 308 is implemented using logic units, FPGAs, ASICs, DSPs, or any other suitable hardware.

In one embodiment, the variable speed control engine 308 is configured to control the operation of the variable-speed blower 224 to adjust the cooling capacity of the HVAC system 200. The variable speed control engine 308 may adjust the fan speed of the variable-speed blower 224 to increase or decrease the cooling capacity of the HVAC system 200. For example, the variable speed control engine 308 may be configured to operate the variable-speed blower 224 at a first fan speed when a determined temperature value is below a first threshold value, to operate the variable-speed blower 224 at a second fan speed when the determined temperature value is above a second threshold value, and to operate the variable-speed blower 224 at a third fan speed that linearly correlates with temperature when the determined temperature value is between the first threshold value and the second threshold value. An example of the variable speed control engine 308 in operation are described in FIG. 5.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise ROM, RAM, ternary content-addressable memory (TCAM), dynamic random-access memory (DRAM), and static random-access memory (SRAM). The memory 304 is operable to store variable speed control instructions 310, temperature threshold values 312. and any other data or instructions. The variable speed control instructions 310 comprise any suitable set of instructions, logic, rules, or code operable to execute the variable speed control engine 308.

The temperature threshold values 312 comprise predetermined values used by the controller 234 to adjust the fan speed of the variable-speed blower 224. Additional information about using temperature threshold values 312 to control the operation of the variable-speed blower 224 is described in FIGS. 4 and 5.

The I/O interface 306 is configured to communicate data and signals with other devices. For example, the I/O interface 306 may be configured to communicate electrical signals with the variable speed blower 224 to control the fan speed and operation of the variable speed blower 224. The I/O interface 306 may use any suitable type communication protocol to communicate signals to the variable speed blower 224. For example, the I/O interface 306 may be configured to transmit pulse width modulation (PWM) signals to the variable speed blower 224 to control the fan speed of the variable speed blower 224. In other examples, the I/O interface 306 may use any other suitable type of signals to control the variable speed blower 224 as would be appreciated by one of ordinary skill in the art. The I/O interface 306 may comprise ports or terminals for establishing signal communications between the controller 234 and other devices. The I/O interface 306 may be configured to enable wire and/or wireless communications.

Figure 4:
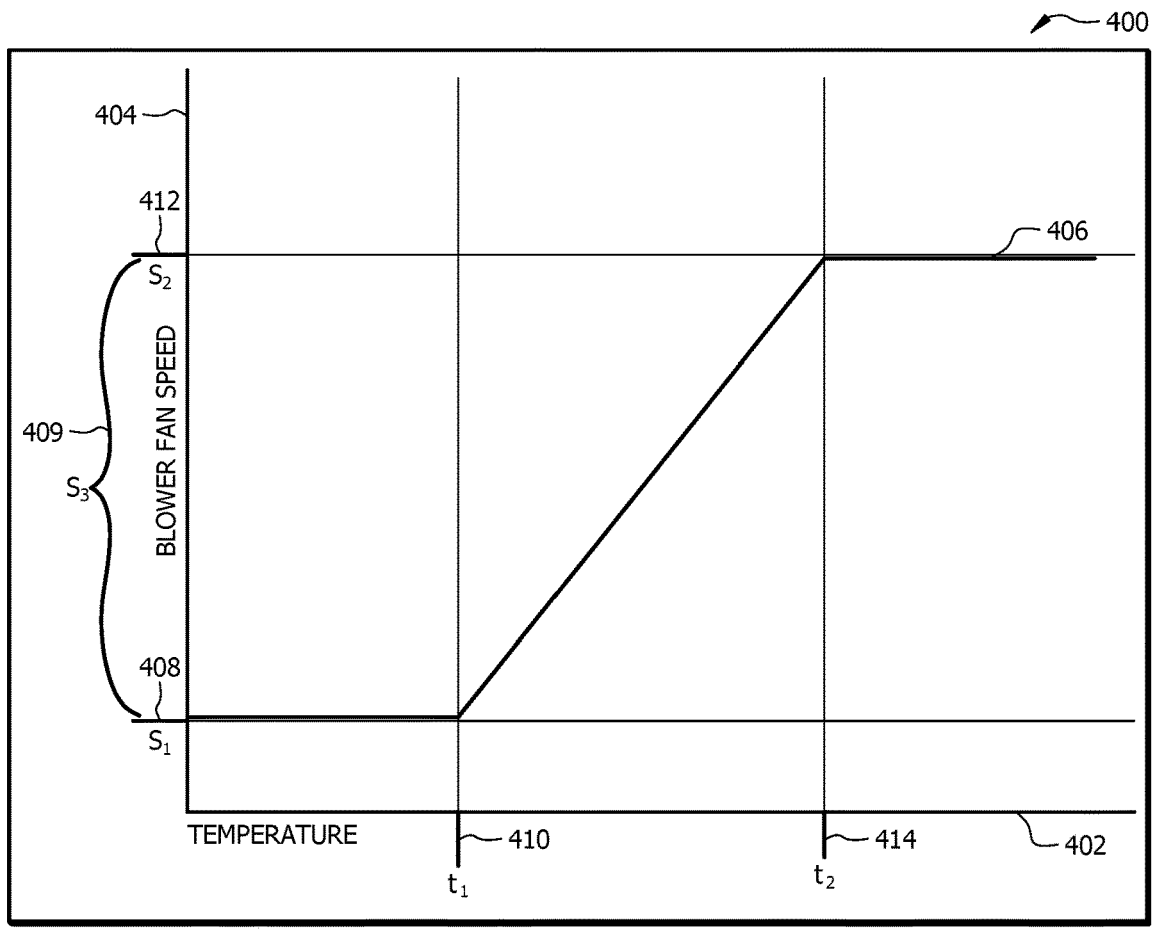
FIG. 4 is a graph of an embodiment of fan speeds for a variable speed blower versus temperature.

FIG. 4 is a graph 400 of an embodiment of fan speeds for a variable-speed blower 224 versus temperature. Axis 402 indicates temperature, for example in degrees Celsius or Fahrenheit, and axis 404 indicates blower fan speeds, for example in cubic feet per minute (CFM). Line 406 is an example of how a variable-speed blower 224 can be configured to operate over a range of temperatures. In this example, the variable speed controller is configured to operate at a first fan speed 408 when the temperature is below a first temperature threshold value 410 and to operate at a second fan speed 412 when the temperature is above a second temperature threshold value 414. The first temperature threshold value 410 and the second temperature threshold value 414 may be five degrees, ten degrees, or any other suitable number of degrees apart from each other. For example, the first temperature threshold value 410 may be set at 65 degrees Fahrenheit and the second temperature threshold value 414 may be set at 95 degrees Fahrenheit. As another example, the first temperature threshold value 410 may be set at 81.5 degrees Fahrenheit and the second temperature threshold value 414 may be set at 95 degrees Fahrenheit. In other examples, the first temperature threshold value 410 and the second temperature threshold value 414 may be set to any other suitable temperature values. In some embodiments, the first fan speed 408 and the second fan speed 412 correspond with lower and upper operating speed limits for the variable-speed blower 224, respectively. In other words, the first fan speed 408 may correspond with a minimum fan speed the variable-speed blower 224 can safely operate at. The second fan speed 412 may correspond with a maximum fan speed the variable-speed blower 224 can safely operate at. In this example, the first fan speed 408 and the second fan speed 412 ensure the variable-speed blower 224 is operating within its limits. Operating the variable-speed blower 224 within the first fan speed 408 and the second fan speed 412 may also help protect the HVAC system 200, for example by preventing evaporator coils from freezing or preventing a motor within the variable-speed blower 224 from overheating.

The first fan speed 408 and the second fan speed 412 may be set at any suitable fan speeds. The second fan speed 412 is a greater speed than the first fan speed 408. For example, the first fan speed 408 may be set at 5000 CFM and the second fan speed 412 may be set at 8300 CFM.

In one embodiment, the variable speed blower 224 is further configured to operate at a third fan speed 409 that linearly correlates with temperature when the temperature is between the first temperature threshold value 410 and the second temperature threshold value 414. In other words, the third fan speed 409 increases linearly as temperature increase and decreases linearly as temperature decreases. In another embodiment, the variable speed blower 224 may be configured to operate at a third fan speed 409 that has a non-linear correlation (e.g. a quadratic or exponential function) with temperature when the temperature is between the first temperature threshold value 410 and the second temperature threshold value 414. The third fan speed 409 allows the variable-speed blower 224 to operate dynamically over a range of fan speeds based on a corresponding temperature. This means that the third fan speed 409 is not a fixed predetermined fan speed and may vary over time. This variable fan speed feature is distinct from conventional variable-speed blower configurations where the variable-speed blower only operates at predetermined fan speeds. The third fan speed 409 may be any speed between the first fan speed 408 and the second fan speed 412.

In some embodiments, the third fan speed 409 may be used to provide a gradual transition between first fan speed 408 and the second fan speed 412. For example, the controller 234 may initially set the variable-speed blower 224 at the second fan speed 412 based on the cooling capacity needed for the HVAC system 200. Over time the cooling capacity need may lower as temperature (e.g. outdoor ambient temperature) decreases. The controller 234 is configured to gradually transition the variable-speed blower 224 to a lower fan speed (e.g. the first fan speed 408) rather than abruptly changing the fan speed from a high speed to a lower speed. The third fan speed 409 provides the ability to gradually transition from the second fan speed 412 to the first fan speed 408. In this example, the controller 234 decreases the speed of variable-speed blower 224 linearly with temperature until the first fan speed 408 is achieved rather than abruptly switching between fan speeds. Similarly, the controller 234 may use a similar process to gradually increase the fan speed of the variable-speed blower 224 from the first fan speed 408 to the second fan speed 412.

In some embodiments, the controller 234 may be configured to gradually transition the fan speed of the variable-speed blower 224 between multiple fan speed levels similar to the first fan speed 408 and the second fan speed 412. For example, the controller 234 may be configured to gradually transition the speed of the variable-speed blower 224 to another fan speed level that is less than the first fan speed 408 or greater than the second fan speed 412. In this example, the controller 234 may use a variable fan speed that linearly correlates with temperature similar the third fan speed 409 to adjust the fan speed of the variable-speed blower 224.

Figure 5:
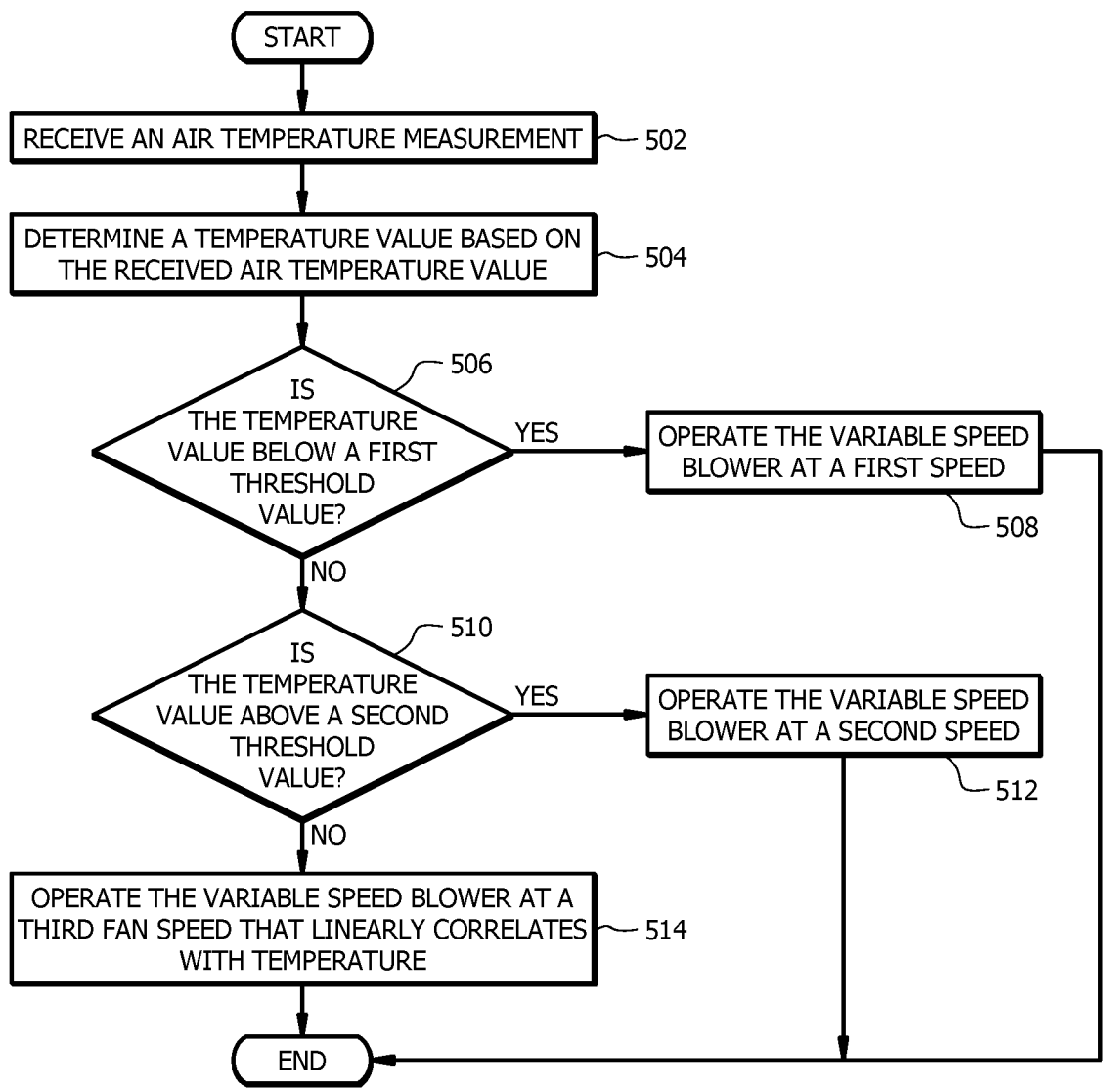
FIG. 5 is a flowchart of an embodiment of a variable speed blower control method.

FIG. 5 is a flowchart of an embodiment of a variable speed blower control method 500 for operating an HVAC system 200 in a variable speed blower control mode. In this mode, the controller 234 adjusts the fan speed of a variable-speed blower 224 to reduce the cooling capacity of the HVAC system 200. In some embodiments, method 500 may be implemented in real-time to continuously adjust the cooling capacity of the HVAC system 200. The variable speed blower control method 500 may be implemented in an HVAC system 200 configured with single-stage or multi-stage compressors 204.

In one embodiment, the controller 234 may employ method 500 to provide a gradual transition between coarse fan speed levels. In other words, the controller 234 may use method 500 to provide a combination of coarse and fine fan speed adjustments. For example, the controller 234 may initially set the variable-speed blower 224 at a first fan speed based on the cooling capacity needed for the HVAC system 200. Over time the cooling capacity need may lower as temperature (e.g. outdoor ambient temperature) decreases. The controller 234 is configured to gradually transition the variable-speed blower 224 to a lower fan speed rather than abruptly changing the fan speed from a high speed to a lower speed. Referring to FIG. 4, the gradual transition from a high fan speed to a low fan speed is illustrated as the third fan speed 409 which varies by temperature. In this example, the controller 234 decreases the speed of variable-speed blower 224 linearly with temperature until the lower fan speed is achieved rather than abruptly switching between fan speeds. Similarly, the controller 234 may use a similar process to gradually increase the fan speed of the variable-speed blower 224 from a low fan speed to a high fan speed.

Returning to FIG. 5, at step 502, the controller 234 receives an air temperature measurement from a sensor 240. The controller 234 may be configured to passively or actively receive air temperature measurements. For example, the controller 234 may be configured to periodically receive air temperature measurements from one or more sensors 240. The controller 234 may receive air temperature measurements every five seconds, ten seconds, thirty seconds, minute, or at any other suitable time interval. As another example, the controller 234 may receive air temperature measurements in response to sending a request or signal to the sensor 240 to request the air temperature measurement.

At step 504, the controller 234 determines a temperature value based on the received air temperature measurement. In one embodiment, the temperature value corresponds with a measured outdoor air temperature. For example, the received air temperature measurement from the sensor 240 may correspond with an outdoor air temperature. In this example, the controller 234 uses the outdoor air temperature as the temperature value.

In another embodiment, the temperature value corresponds with a temperature difference between a measured return air temperature and a temperature set point. For example, the received air temperature measurement from the sensor 240 may correspond with a measured return air temperature. In this example, the controller 234 determines the difference between the measured return air temperature and a temperature set point. The controller 234 uses the determined difference as the temperature value. In other embodiments, the controller 234 may use any other received air temperature measurement as the temperature value.

At step 506, the controller 234 determines whether the temperature value is below a first threshold value. For example, the controller 234 may compare the determined temperature value to the first threshold value to determine whether the temperature value is less than the first threshold value. The first threshold value may be any suitable predetermined value. The controller 234 proceeds to step 508 when the controller 234 determines that the temperature value is below the first threshold value. Otherwise, the controller 234 proceeds to step 510 when the controller 234 determines that the temperature value is above the first threshold value.

At step 508, the controller 234 operates the variable-speed blower 224 at a first fan speed. For example, the controller 234 may operate the variable-speed blower 224 at a first fan speed of 5000 CFM. In other examples, the controller 234 may operate the variable-speed blower 224 at any other suitable fan speed. The controller 234 may send any suitable type of control signal to adjust the fan speed of the variable-speed blower 224. In one embodiment, the controller 234 operates one or more compressors 204 at a constant speed when adjusting the operating speed of the variable-speed blower 224.

Returning to step 506, the controller 234 proceeds to step 510 when the controller 234 determines that the temperature value is above the first threshold value. At step 510, the controller 234 determines whether the temperature value is above a second threshold value. For example, the controller 234 may compare the determined temperature value to the second threshold value to determine whether the temperature value is greater than the second threshold value. The second threshold value may be any suitable predetermined value. The controller 234 proceeds to step 512 when the controller 234 determines that the temperature value is above the second threshold value. Otherwise, the controller 234 proceeds to step 514 when the controller 234 determines that the temperature value is below the second threshold value.

At step 512, the controller 234 operates the variable-speed blower 224 at a second fan speed. The second fan speed is greater than the first fan speed. For example, the controller 234 may operate the variable-speed blower 224 at a second fan speed of 8500 CFM. In other examples, the controller 234 may operate the variable-speed blower 224 at any other suitable fan speed. The controller 234 may send any suitable type of control signal to adjust the fan speed of the variable-speed blower 224. In one embodiment, the controller 234 operates one or more compressors 204 at a constant speed when adjusting the operating speed of the variable-speed blower 224.

Returning to step 510, the controller 234 proceeds to step 514 when the controller 234 determines that the temperature value is below the second threshold value. In other words, the controller 234 proceeds to step 514 when the temperature value is between the first threshold value and the second threshold value. At step 514, the controller 234 operates the variable-speed blower 224 at a third fan speed that linearly correlates with temperature. For example, referring to FIG. 4, the controller 234 operates the variable-speed blower 224 at a third fan speed 409 between the first fan speed 408 and the second fan speed 412. The controller 234 determines the third fan speed 409 based on the temperature value. In one embodiment, the controller 234 may use a mapping function that correlates temperature with fan speeds to determine the third fan speed. In this configuration, the controller 234 may use the determined temperature value as an input to the mapping function to determine the corresponding fan speed. In another embodiment, the controller 234 may use a look-up table to determine the third fan speed based on the temperature value. In this configuration, the controller 234 may use the determined temperature value as a search token for identifying an entry in the look-up table. The entry may identify the determined temperature value and its corresponding fan speed. The controller 234 may send any suitable type of control signal to adjust the fan speed of the variable-speed blower 224. In one embodiment, the controller 234 operates one or more compressors 204 at a constant speed when adjusting the operating speed of the variable-speed blower 224.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A temperature control system, comprising:
a sensor configured to measure air temperature;
a variable speed blower; and
a controller in signal communication with the sensor and the variable speed blower, wherein the controller is configured to:
    receive an air temperature measurement from the sensor;
    determine a temperature value based on the received air temperature measurement;
    compare the determined temperature value to a plurality of threshold values, wherein the plurality of threshold values comprises:
        a first threshold value corresponding with a first temperature;
        a second threshold value corresponding with a second temperature that is greater than the first temperature;
        a third threshold value corresponding with a third temperature that is greater than the second temperature; and
        a fourth threshold value corresponding with a fourth temperature that is greater than the third temperature; and
    operate the variable speed blower based on the comparison of the determined temperature value to the plurality of threshold values, wherein operating the variable speed blower comprises setting the variable speed blower to:
        a first fan speed when the temperature value is below the first threshold value;
        a second fan speed when the temperature value is above the fourth threshold value, wherein the second fan speed is greater than the first fan speed;
        a third fan speed when the temperature value is between the second threshold value and the third threshold value, wherein the third fan speed is greater than the first fan speed and is less than the second fan speed;
        a fourth fan speed that linearly correlates with temperature when the temperature value is between the first threshold and the second threshold, wherein:
            the fourth fan speed is a speed between the first fan speed and the third seed fan speed; and
            setting the variable speed blower to the fourth fan speed comprises determining the fourth fan speed based on the determined temperature value;
        a fifth fan speed that linearly correlates with temperatures when the temperature value is between the third threshold value and the fourth threshold value, wherein the fifth fan speed is between the second fan speed and the third fan speed.

2. The system of claim 1, wherein:
the sensor is configured to measure outdoor air temperature; and
the temperature value is equal to the measured outdoor air temperature.

3. The system of claim 1, wherein:
the sensor is configured to measure return air temperature; and
the temperature value is equal to the difference between the measured return air temperature and a temperature set point.

4. The system of claim 1, further comprising a compressor in signal communication with the controller, wherein the controller is configured to operate the compressor at a constant speed when adjusting the speed of the variable speed blower.

5. The system of claim 1, further comprising a plurality of compressors in signal communication with the controller, wherein the controller is configured to operate the plurality of compressors at a constant speed when adjusting the speed of the variable speed blower.

6. The system of claim 5, wherein the controller is configured to operate the plurality of compressors in:
a first mode where all of the plurality of compressors are on; and
a second mode where at least one of the plurality of compressors is off.

7. The system of claim 1, wherein a difference between the first threshold value and the second threshold value is at least ten degrees.

8. The system of claim 1, wherein a difference between the first threshold value and the second threshold value is at least five degrees.

9. A temperature control method, comprising:
receiving, by a controller, an air temperature measurement from a sensor;
determining, by the controller, a temperature value based on the received air temperature measurement;
comparing, by the controller, the determined temperature value to a plurality of threshold values, wherein the plurality of threshold values comprises:
a first threshold value corresponding with a first temperature;
a second threshold value corresponding with a second temperature that is greater than the first temperature;
a third threshold value corresponding with a third temperature that is greater than the second temperature; and
a fourth threshold value corresponding with a fourth temperature that is greater than the third temperature; and
operating, by the controller, a variable speed blower based on the comparison of the determined temperature value to the plurality of threshold values, wherein operating the variable speed blower comprises:
setting the variable speed blower to a first fan speed when the temperature value is below the first threshold value;
setting the variable speed blower to a second fan speed when the temperature value is above the fourth threshold value, wherein the second fan speed is greater than the first fan speed;
setting the variable speed blower to a third fan speed when the temperature value is between the second threshold value and the third threshold value, wherein the third fan speed is greater than the first fan speed and is less than the second fan speed;
setting the variable speed blower to a fourth fan speed that linearly correlates with temperature when the temperature value is between the first threshold and the second threshold, wherein:
the fourth fan speed is a speed between the first fan speed and the third fan speed; and
setting the variable speed blower to the fourth fan speed comprises determining the fourth fan speed based on the determined temperature value; and
setting the variable fan speed to a fifth fan speed that linearly correlates with temperatures when the temperature value is between the third threshold value and the fourth threshold value, wherein the fifth fan speed is between the second fan speed and the third fan speed.

10. The method of claim 9, further comprising measuring, by the sensor, outdoor air temperature; and
wherein determining the temperature value comprises setting the temperature value equal to the measured outdoor air temperature.

11. The method of claim 9, further comprising:
measuring, by the sensor, a return air temperature; and
determining a difference between the measured return air temperature and a temperature set point; and
wherein determining the temperature value comprises setting the temperature value equal to the difference between the measured return air temperature and the temperature set point.

12. The method of claim 9, further comprising operating, by the controller, a compressor at a constant speed when adjusting the speed of the variable speed blower.

13. The method of claim 9, further operating, by the controller, a plurality of compressors at a constant speed when adjusting the speed of the variable speed blower.

14. The method of claim 13, wherein the controller is configured to operate the plurality of compressors in:
a first mode where all of the plurality of compressors are on; and
a second mode where at least one of the plurality of compressors is off.

15. The method of claim 9, wherein a difference between the first threshold value and the second threshold value is at least ten degrees.

16. The method of claim 9, wherein a difference between the first threshold value and the second threshold value is at least five degrees.

17. A temperature control method, comprising:
receiving, by a controller, an air temperature measurement from a sensor;
determining, by the controller, a temperature value based on the received air temperature measurement;
comparing, by the controller, the determined temperature value to a plurality of threshold values, wherein the plurality of threshold values comprises:
a first threshold value corresponding with a first temperature;
a second threshold value corresponding with a second temperature that is greater than the first temperature;
a third threshold value corresponding with a third temperature that is greater than the second temperature; and
a fourth threshold value corresponding with a fourth temperature that is greater than the third temperature;
operating, by the controller, a variable speed blower based on the comparison of the determined temperature value to the plurality of threshold values, wherein operating the variable speed blower comprises:

setting the variable speed blower to a first fan speed when the temperature value is below the first threshold value;

setting the variable speed blower to a second fan speed when the temperature value is above the fourth threshold value, wherein the second fan speed is greater than the first fan speed;

setting the variable speed blower to a third fan speed when the temperature value is between the second threshold value and the third threshold value, wherein the third fan speed is greater than the first fan speed and is less than the second fan speed;

setting the variable speed blower to a fourth fan speed that linearly correlates with temperature when the temperature value is between the first threshold and the second threshold, wherein:

the fourth fan speed is a speed between the first fan speed and the third fan speed; and setting the variable speed blower to the fourth fan speed comprises determining the fourth fan speed based on the determined temperature value; and setting the variable fan speed to a fifth fan speed that linearly correlates with temperatures when the temperature value is between the third threshold value and the fourth threshold value, wherein the fifth fan speed is between the second fan speed and the third fan speed; and operating, by the controller, a plurality of compressors at a constant speed when adjusting the speed of the variable speed blower.

18. The method of claim 17, further comprising measuring, by the sensor, outdoor air temperature; and wherein determining the temperature value comprises setting the temperature value equal to the measured outdoor air temperature.

19. The method of claim 17, further comprising:

measuring, by the sensor, a return air temperature; and determining a difference between the measured return air temperature and a temperature set point; and wherein determining the temperature value comprises setting the temperature value equal to the difference between the measured return air temperature and the temperature set point.

20. The method of claim 17, wherein the controller is configured to operate the plurality of compressors in:

a first mode where all of the plurality of compressors are on; and a second mode where at least one of the plurality of compressors is off.

* * * * *